(12) United States Patent
Ooms

(10) Patent No.: US 6,196,608 B1
(45) Date of Patent: Mar. 6, 2001

(54) CENTER MOUNTED TAILGATE

(75) Inventor: Nevill P. Ooms, Huntington Beach, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/407,341

(22) Filed: Sep. 29, 1999

(51) Int. Cl.$^7$ .................................................. B62D 25/00
(52) U.S. Cl. ................................. 296/57.1; 296/146.11; 296/202
(58) Field of Search ............................. 296/57.1, 146.11, 296/146.8, 202, 56, 106; 16/387, 392, 252; 49/381, 501, 397

(56) References Cited

U.S. PATENT DOCUMENTS

| 1,139,458 | * | 5/1912 | Ledwinka ............................... 296/56 |
| 3,828,476 | * | 8/1974 | Tenenbaum et al. . |
| 4,010,504 | * | 3/1977 | Griffin . |
| 4,358,150 | | 11/1982 | Nash . |
| 4,389,067 | * | 7/1983 | Rubio .................................... 296/50 |
| 4,913,615 | | 4/1990 | Ward . |
| 5,393,115 | | 2/1995 | Hamilton . |
| 5,448,856 | | 9/1995 | Moore et al. . |
| 5,451,089 | | 9/1995 | Bender . |
| 5,531,498 | | 7/1996 | Kowall . |
| 5,806,917 | * | 9/1998 | Townsend ............................. 296/202 |

FOREIGN PATENT DOCUMENTS

1101183 * 3/1961 (DE) ................................ 296/146.11

* cited by examiner

Primary Examiner—D. Glenn Dayoan
Assistant Examiner—Mickki Murray
(74) Attorney, Agent, or Firm—Mark P. Calcaterra

(57) ABSTRACT

A hinge assembly for a center mounted tailgate is provided. The hinge assembly includes a pair of hinge members and a hinge pin structure having a pin member and a pair of mounting brackets. The pin member includes a pair of generally cylindrical pin ends and a pin axis. Each of the mounting brackets are fixedly coupled to the pin member and include a first portion and a second portion. The first portion is spaced apart from and generally parallel to the pin axis and is adapted for mounting the hinge pin structure to a vehicle body. The second portion fixedly couples the first portion to the pin member. The hinge members include a first hinge portion and a second hinge portion. The first hinge portion has as generally hollow interior that is operable for engaging an end of the pin member to permit the first hinge portion to rotate about the pin axis. The first hinge portion may include a bearing for supporting the hinge member for rotation about the pin member. The second hinge portion is coupled to the first hinge portion and is adapted for coupling the closure member to the hinge member.

1 Claim, 3 Drawing Sheets

CENTER MOUNTED TAILGATE

BACKGROUND OF THE INVENTION

1. Technical Field

The present invention pertains generally to motor vehicles. More particularly, the present invention pertains to hinged closure panels for motor vehicles. More specifically, but without restriction to the particular embodiment and/or use which is shown and described for purposes of illustration, the present invention relates to a pick-up truck having a tailgate attached to the body for rotation about a horizontal pivot axis about a lower edge of the tailgate and a centrally located, concealed hinge mechanism for permitting the tailgate to articulate between a closed position and an open position.

2. Discussion

In pick-up trucks, sport utility vehicles, station wagons, minivans and other similar vehicles having a substantially vertical rear access opening, there is often provided a tailgate assembly that is pivotably coupled to the body of the vehicle through a plurality of hinges that permit the tailgate to pivot about a horizontal pivot axis between a closed position and an open position.

Conventional tailgate hinging methods typically rely on two or more independent hinge members having a pair of leaf-members one of which is fastened to the tailgate and the other of which is fastened to the vehicle body. The independent nature of these hinges permits their axes to become skewed relative to one another due to variances in the manufacture and assembly of the vehicle body and the tailgate assembly. The skewing of the hinge axes leads to a binding condition that impairs performance of the hinges. Under extreme circumstances, the skewing of the hinge axes may cause the hinges to bind so severely as to require realignment of the hinges.

Another drawback of the conventional tailgate hinging methods concerns the conventional use of a hinge pin of a relatively small diameter and the correspondingly small surface area of the pin. As the weight of the tailgate is distributed over a relatively small surface area, stress over the surface of the hinge pin is relatively high, causing increased wear and further impairing performance.

While these drawbacks may be overlooked in vehicles which have completely manual tailgates, the need for improved performance becomes more apparent when a drive unit for automatically closing the tailgate is incorporated into the vehicle. Improved performance from the hinge assembly not only provides more reliable operation but also permits the drive unit to be down-sized to enable substantial cost savings.

Accordingly, there remains a need in the art for an improved hinge assembly for a tailgate which provides improved alignment along a central pin axis, increases the surface area over which the weight of the tailgate is distributed and provides an improved and consistent level of performance.

SUMMARY OF THE INVENTION

It is therefore a general object of the present invention to provide a hinge assembly for a vehicle tailgate which overcomes the disadvantages associated with prior known hinge arrangements.

It is a more specific object of the present invention to provide a hinge assembly for a vehicle tailgate which offers simple construction that leads to improved performance and design flexibility.

Accordingly, a hinge assembly for a center mounted tailgate is provided. The hinge assembly of the present invention includes a pair of hinge members and a hinge pin structure having a pin member and a pair of mounting brackets. The pin member includes a pair of pin ends and a pin axis. Each of the mounting brackets are fixedly coupled to the pin member and include a first portion and a second portion. The first portion is spaced apart from and generally parallel to the pin axis and is adapted for mounting the hinge pin structure to a vehicle body. The second portion fixedly couples the first portion to the pin member. The hinge members include a first hinge portion and a second hinge portion. The first hinge portion has as generally hollow interior that is operable for engaging an end of the pin member to permit the first hinge portion to rotate about the pin axis. The first hinge portion may include a bearing for supporting the hinge member for rotation about the pin member. The second hinge portion is coupled to the first hinge portion and is adapted for coupling the closure member to the hinge member.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
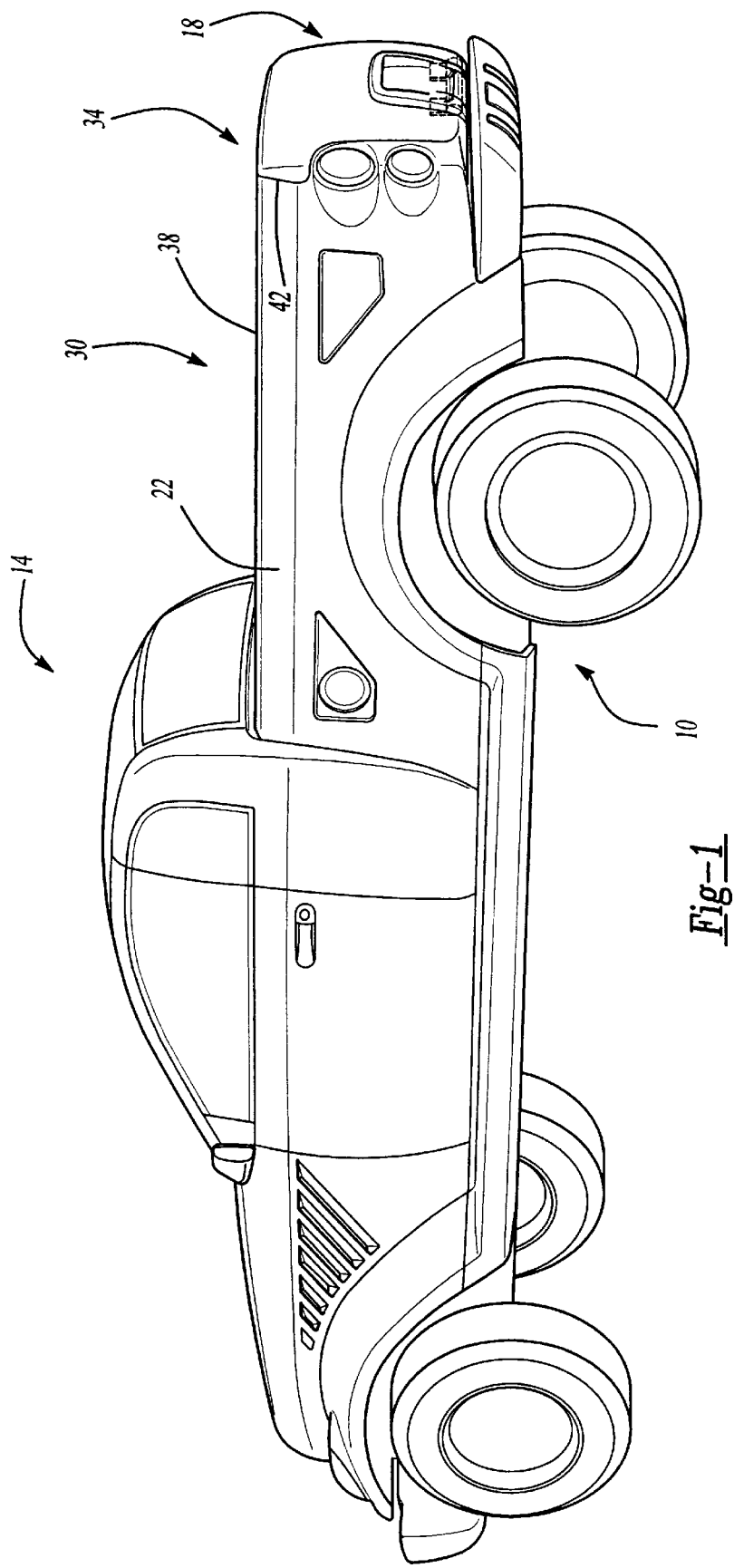
FIG. 1 is a perspective view of a motor vehicle incorporating a tailgate with the center-mounted hinge constructed in accordance with the teachings of a preferred embodiment of the present invention, illustrated with the tailgate in the closed position.
Figure 2:
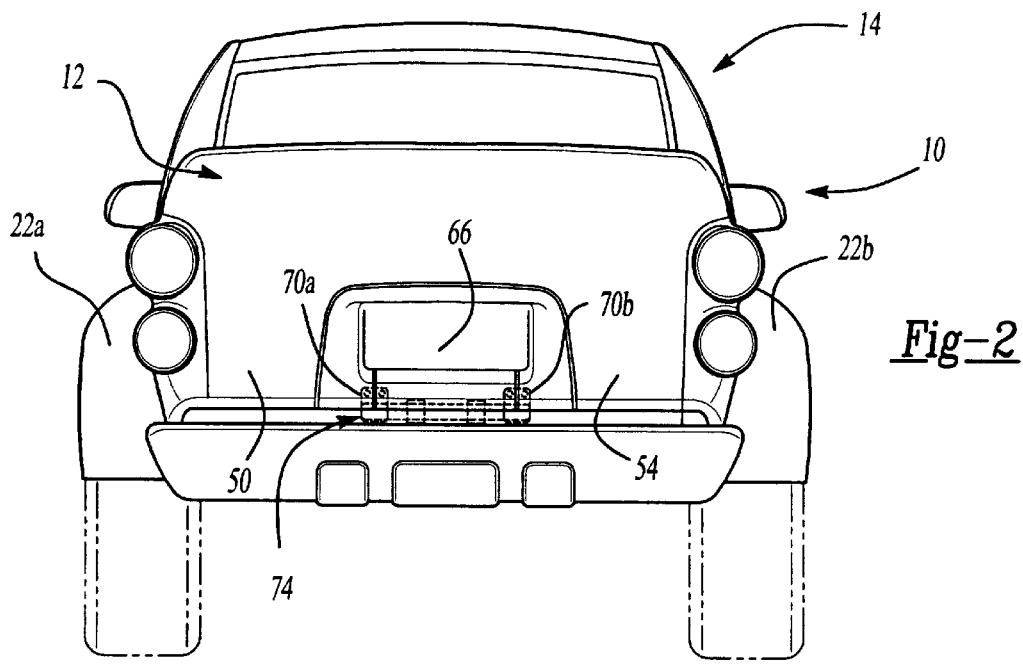
FIG. 2 is a rear view of the exemplary motor vehicle of FIG. 1, again illustrated with the tailgate in the closed position.
Figure 3:
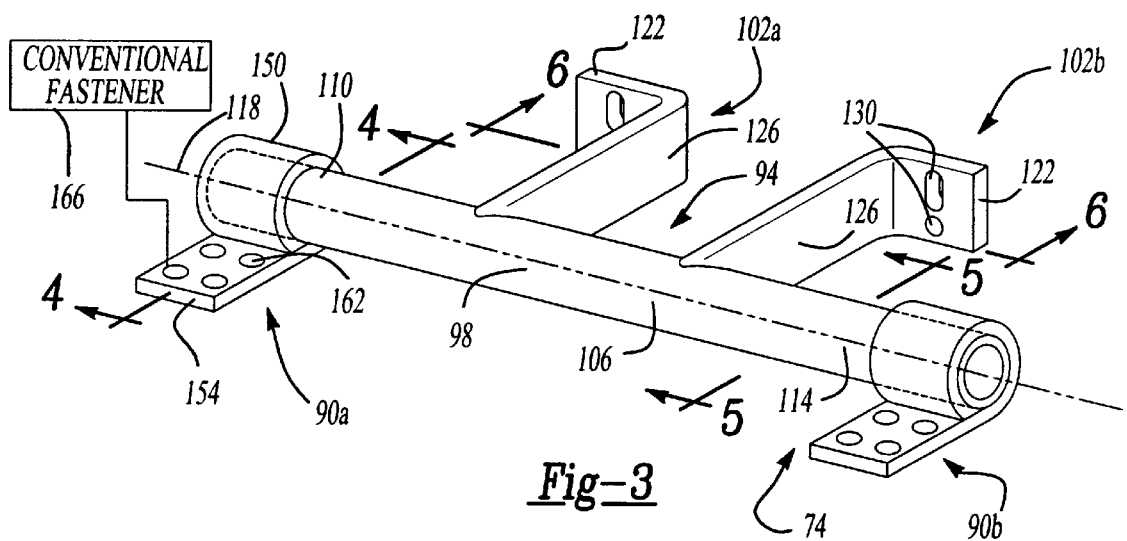
FIG. 3 is a perspective view of the hinge assembly of the present invention illustrating the hinge assembly as it would be positioned when the tailgate is in the open position.
Figure 4:
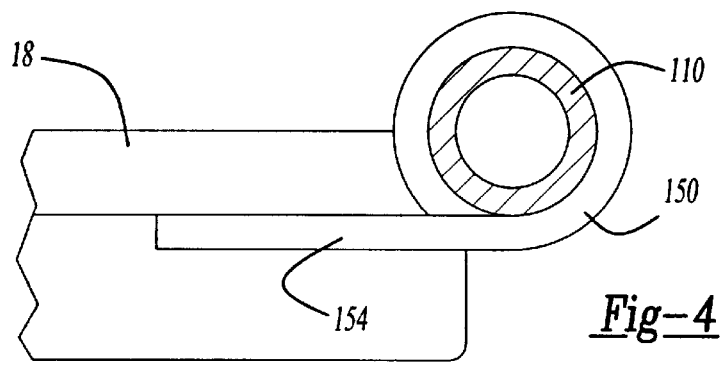
FIG. 4 is a cross-sectional view of the hinge assembly shown in FIG. 3 taken along the line 4—4 of FIG. 3 illustrating the hinge assembly in operative association with the tailgate when the tailgate is positioned in the open position.
Figure 5:
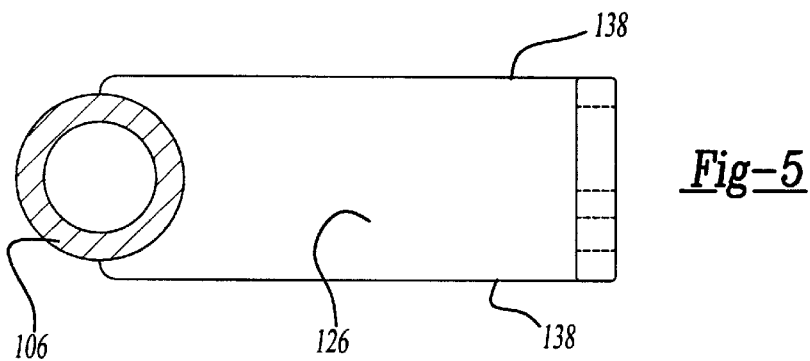
FIG. 5 is a cross-sectional view of the hinge assembly shown in FIG. 3 taken along the line 5—5 of FIG. 3.
Figure 6:
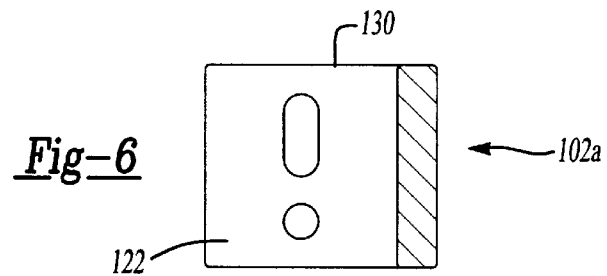
FIG. 6 is a cross-sectional view of the hinge assembly shown in FIG. 3 taken along the line 6—6 of FIG. 3.
Figure 8:
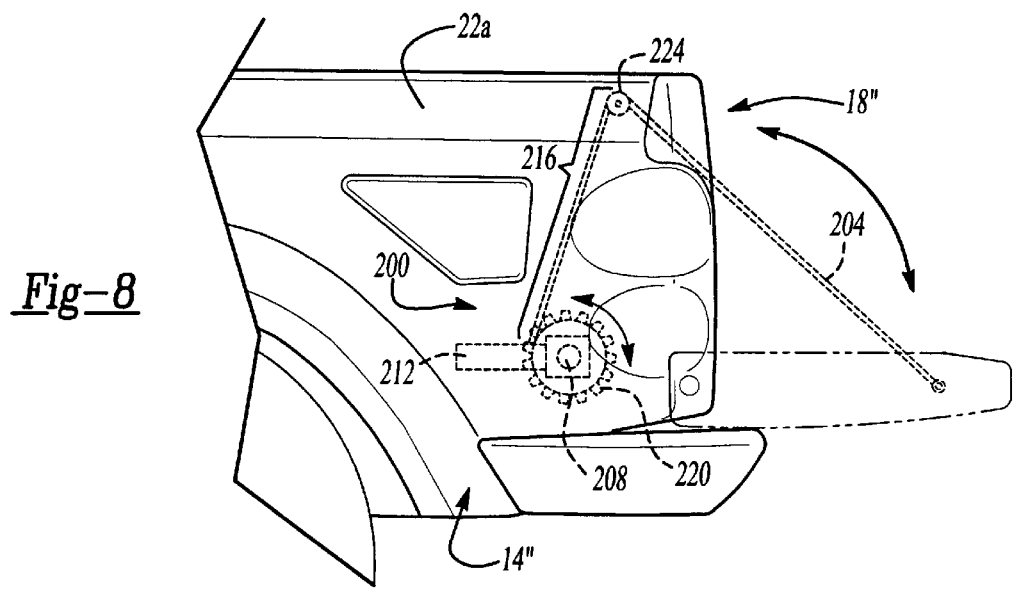
FIG. 8 is a side view of a motor vehicle incorporating a power actuated tailgate with the center-mounted hinge assembly constructed in accordance with the teachings of a preferred embodiment of the present invention.

With reference to FIGS. 1 and 2 of the drawings, a motor vehicle constructed in accordance with the teachings of the preferred embodiment of the present invention is generally identified at reference numeral 10. As will be discussed in greater detail below, vehicle 10 includes a vehicle body 14 and a closure member, such as tailgate 18, which may be articulated between a closed position as illustrated in FIGS. 1 and 2 and an open position as illustrated in FIG. 8. Although the particular vehicle illustrated is a pick-up truck, it will be understood that the teachings of the present invention have applicability to other types of vehicles, including but not limited to sport utility vehicles, minivans, station wagons and other vehicles having a tailgate which pivots about a lower horizontal axis.

Vehicle body 14 includes a pair of laterally spaced apart side walls 22 and a generally horizontal floor (not shown) which conventionally form a bed 30 with a bed aperture 34 formed at its rearward end 38. The rearward edges 42 of laterally spaced apart side walls 22 may be formed in a generally vertical manner or may be contoured to a desired shape as illustrated.

Tailgate 18 includes a lower edge 46 which is formed in three sections. The first and second sections 50 and 54, respectively, are positioned proximate the first and second lateral sides 22a and 22b, respectively, of tailgate 18 and extend generally horizontally inward toward the center of tailgate 18. The third section 66 is adjacent to the first and second sections 50 and 54. Third section 66 includes a pair of hinge apertures 70a, 70b which will be discussed in greater detail below. A hinge assembly 74 is employed to mount tailgate 18 to vehicle body 14 adjacent third section 66 of tailgate 18. Hinge assembly 74 permits tailgate 18 to be articulated between the closed position wherein tailgate 18 substantially covers bed aperture 34 and the open position wherein tailgate 18 substantially clears bed aperture 34.

In FIGS. 3 through 6, hinge assembly 74 is shown to include a pair of hinge members 90a, 90b and a hinge pin structure 94 having a pin member 98 and a pair of mounting brackets 102a, 102b. Pin member 98 includes a body portion 106 having first and second pin ends 110 and 114, respectively, which, in the particular embodiment illustrated, are generally cylindrical in shape. The remainder of body portion 106 may be configured in any manner desired to achieve a set of predetermined design criteria which may include, for example, the overall appearance of pin member 98. A generally horizontal pin axis 118 is formed by first and second pin ends 110 and 114. Pin member 98 is preferably formed from a tubular steel material having an outside diameter of about 0.5 inches to about 2.5 inches and a wall thickness of about 0.11 inches to about 0.25 inches.

Mounting brackets 102a, 102b are generally L-shaped and each include a first bracket portion 122 which is spaced apart from and generally parallel to pin axis 118 and a second bracket portion 126 which fixedly couples first bracket portion 122 and pin member 98. First bracket portion 122 includes a plurality of bracket mounting apertures 130 which permit mounting brackets 102a, 102b to be secured to vehicle body 14 through conventional fasteners (not shown). Preferably, mounting brackets 102a, 102b are formed from a steel material in a stamping process and welded to pin member 98. Suitable stamping processes may include the use of progressive dies, fourslides or multislides. Second bracket portion 126 is configured in a manner to rigidly support pin member 98. In the particular embodiment shown, the edges 138 of second bracket portion 126 are shown to taper outwardly and approach the width of first bracket portion 122.

Each hinge member 90a and 90b is shown to include a first hinge portion 150 and a second hinge portion 154. Hinge member 90a and 90b is preferably formed from a sheet steel material having a thickness of about 0.18 inches to about 0.25 inches. First hinge portion 150 is formed as a generally hollow cylinder sized to engage the first and second pin ends 110 and 114 of pin member 98. Second hinge portion 154 is coupled to first hinge portion 150 and includes a plurality of hinge fastening apertures 162 which permit hinge member 90 to be fixedly coupled to the third portion 66 of tailgate 18 via a plurality of conventional fasteners 166. Second hinge portion 154 includes a portion that extends outwardly away from first hinge portion 150 along a plane parallel to pin axis 118.

In operation, the first hinge portions 150 of first and second hinge members 90a, 90b, slide around first and second pin ends 110 and 114, respectively, as tailgate 18 is moved between the closed and open positions.

Figure 7:
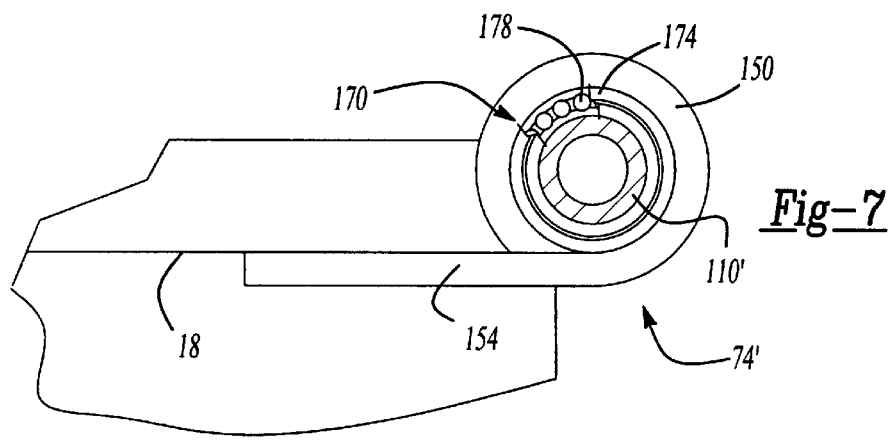
FIG. 7 is a cross-sectional view similar to that of FIG. 4 illustrating the preferred embodiment of hinge assembly of the present invention.

As shown in FIG. 7, a bearing 170 may be included in each hinge member 90a and 90b to further improve the performance of the hinge assembly 74'. As shown, bearing 170 includes a seal 174 to prevent dirt and grime from contacting the bearing rollers 178 to maintain performance of the bearing 170 at optimal levels.

The improved performance of hinge assembly 74 is particularly useful in applications where tailgate 18 is moved between the closed and open positions through an automatically controlled drive unit, such as the one shown in FIG. 8 and generally indicated by reference numeral 200. A detailed description of a suitable drive unit is beyond the scope of the present invention and need not be provided herein. Briefly, drive unit 200 includes a pair of chains 204 attached to the lateral sides 22a and 22b of tailgate 18", a drive rod 208 mounted to vehicle body 14" for rotation about an axis parallel to pin axis 118, a drive motor 212 and a geartrain 216 having a drive gear 220 and an idler gear 224 on both lateral sides of the vehicle to engage each chain 204. Operation of drive motor 212 in a first direction transmits drive torque into drive rod 208 and causes the drive gears 220 to pull their respective chains 204 to cause tailgate 18" to pivot about hinge assembly 74 into the closed position. Drive unit 200 is described in more detail in commonly assigned U.S. Ser. No. 09/222,563, filed Dec. 29, 1998, which is hereby incorporated by reference as if fully set forth herein.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:
1. A motor vehicle comprising:
 a vehicle body defining a bed having a bed aperture;
 a tailgate assembly;
 a plurality of first conventional fasteners;
 a plurality of second conventional fasteners; and
 a hinge mechanism having a hinge pin structure and a pair of hinge members, the hinge pin structure including a pin member and a pair of mounting brackets, the pin member having a unitarily formed body portion and a pair of pin ends, each of the pin ends being generally cylindrical in shape, each of the pin ends being fixedly coupled to the body portion about a generally horizontal axis, the mounting brackets being generally

L-shaped and having first and second bracket portions, the first bracket portion fixedly coupled to the body portion and extending generally perpendicular to the generally horizontal axis, the first bracket portion extending substantially around one-half of the perimeter of the body portion, the second bracket portion being spaced apart from and generally parallel to the generally horizontal axis, the second bracket portion being fixedly coupled to an end of the first bracket portion opposite the body portion, each of the second bracket portions having a plurality of mounting apertures, each of the plurality of first conventional fasteners extending through an associated one of the mounted apertures and coupling the hinge pin structure to the vehicle body, each of the pair of hinge members being unitarily formed from a sheet steel material and having first and second hinge portions, each of the first hinge portions being formed as a generally hollow cylinder sized to engage an associated one of the pin ends, each of the second hinge portions being fixedly coupled to an associated one of the first hinge portions and extending therefrom in a plane that is spaced apart from and parallel to the generally horizontal axis, the second hinge portion, each of the second hinge portions having a plurality of hinge fastening apertures, each of the plurality of second conventional fasteners extending through an associated one of the hinge fastening apertures and fixedly coupling the hinge members to the tailgate, the hinge members rotating about the pin ends to permit the tailgate to be moved between a generally vertical position substantially closing the bed aperture in the vehicle body and a generally horizontal position substantially clearing the bed aperture in the vehicle body.

* * * * *